US008820623B2

(12) United States Patent
Mayer et al.

(10) Patent No.: US 8,820,623 B2
(45) Date of Patent: Sep. 2, 2014

(54) POSITION-MEASURING DEVICE

(75) Inventors: Elmar Mayer, Nussdorf (DE); Johann Oberhauser, Vachendorf (DE); Heinz Tovar, Siegsdorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 890 days.

(21) Appl. No.: 12/106,854

(22) Filed: Apr. 21, 2008

(65) Prior Publication Data

US 2008/0257951 A1    Oct. 23, 2008

(30) Foreign Application Priority Data

Apr. 20, 2007  (DE) .......................... 10 2007 018 748

(51) Int. Cl.
*G06F 17/00*         (2006.01)
(52) U.S. Cl.
USPC ........................................................ 235/375
(58) Field of Classification Search
CPC .......... G01D 5/34776; G01D 5/34792; G01D 5/2053; G01D 5/24461; G01D 5/2495; G01D 5/2497; H03M 1/0685; H03M 1/282
USPC ........................................................ 235/375
See application file for complete search history.

(56) References Cited

U.S. PATENT DOCUMENTS

| | | | |
|---|---|---|---|
| 4,631,519 A | 12/1986 | Johnston | |
| 6,664,535 B1 * | 12/2003 | Nahum et al. | ........... 250/231.14 |
| 2003/0145479 A1 | 8/2003 | Mayer et al. | |
| 2004/0133844 A1 | 7/2004 | Mittmann | |
| 2005/0072016 A1 * | 4/2005 | Strasser et al. | .................. 33/706 |
| 2008/0117414 A1 * | 5/2008 | Hollander | ................ 356/139.09 |

FOREIGN PATENT DOCUMENTS

| | | |
|---|---|---|
| DE | 102 44 235 | 3/2004 |
| EP | 1 329 696 | 7/2003 |
| EP | 1 403 623 | 3/2004 |
| GB | 2 126 444 | 3/1984 |

OTHER PUBLICATIONS

Stevenson et al., "Absolute Position Measurement Using Optical Detection of Coded Patters," Journal of Physics E/Scientific Instruments 21 (Dec. 1988), No. 12, Bristol, GB, pp. 1140 to 1145.
Search Report, European Application No. 08 00 6725, dated Jul. 22, 2008, (translated).

* cited by examiner

*Primary Examiner* — Seung Lee
*Assistant Examiner* — Tae Kim
(74) *Attorney, Agent, or Firm* — Kenyon & Kenyon LLP

(57) ABSTRACT

A position-measuring device includes a code, including a series of code elements arranged one behind the other in a measuring direction, in which at least two consecutive code elements respectively form a code word containing a position information item, and a scanning device having detector elements for reading the at least two code elements of the code that form a code word, and an evaluation device in which the code word having the current position information may be ascertained from the scanning signals of the detector elements. The scanning device and the code are arranged in a moveable manner relative to each other in the measuring direction. Between adjacent code elements, which have identical properties in the transition region, separating elements having complementary properties are inserted.

23 Claims, 7 Drawing Sheets

POSITION-MEASURING DEVICE

CROSS-REFERENCE TO RELATED APPLICATIONS

The present application claims priority to Application No. 10 2007 018 748.5, filed in the Federal Republic of Germany on Apr. 20, 2007, which is expressly incorporated herein in its entirety by reference thereto.

FIELD OF THE INVENTION

The present invention relates to a position-measuring device, e.g., for determining an absolute position.

BACKGROUND INFORMATION

In many areas, absolute position-measuring devices are increasingly used, in which the absolute position information is derived from a code track having code elements situated one behind the other in the measuring direction. For this purpose, the code elements are provided in a pseudo-random distribution such that a certain number of consecutive code elements respectively form one bit pattern. When shifting the scanning device with respect to the code track by a single code element, a new bit pattern is already formed and a sequence of varying bit patterns is available over the entire measuring region to be detected in an absolute manner.

Such a sequential code is called a chain code or a pseudo-random code (PRC).

The article, "Absolute Position Measurement Using Optical Detection of Coded Patterns," by J. T. M. Stevenson and J. R. Jordan in the Journal of Physics E/Scientific Instruments 21 (1988), No. 12, pages 1140 through 1145, states that each code element is made up of a specified sequence of two partial regions having mutually complementary optical properties.

The article refers to U.K. Published Patent Application No. 2 126 444. For generating the binary information in such a Manchester encoding, this document provides for comparing the analog scanning signals of the code regions with a specified trigger threshold, and to generate an item of binary information 0 or 1 as a function of the result.

This comparison with a definitively specified trigger threshold has the disadvantage that fluctuations in the analog scanning signals may result in a faulty generation of the binary information.

German Published Patent Application No. 102 44 235 also describes a position-measuring device whose absolute code track is made up of a pseudo-random order of code elements that have a Manchester encoding. To determine whether the scanning signals of detector elements contain valid values there is a provision for using scanning signals of an incremental track, which extends parallel to the absolute code track, for selecting the detector elements required for evaluating the absolute track. For the purpose of evaluating the reliability of the detector signals, it is suggested to divide the detector elements into a group having even-numbered and a group having odd-numbered detector elements and to form respective differential signals of directly consecutive detector elements of each group and to compare these with a comparison value. The position value is finally formed from the valid scanning signals resulting from the comparison.

SUMMARY

Example embodiments of the present invention provide improvements to the dependability or operational reliability of an absolute position-measuring device.

A position-measuring device is provided, having a code, including a series of code elements situated one behind the other in a measuring direction, in which at least two consecutive code elements respectively form a code word containing a position information item, and a scanning device having detector elements for reading the at least two code elements of the code that form a code word, and an evaluation device in which the code word containing the current position information may be ascertained from the scanning signals of the detector elements. The scanning device and the code are situated in a moveable manner relative to each other in the measuring direction. Between adjacent code elements having identical properties in the transition region, separating elements are inserted that have respectively complementary properties.

According to an example embodiment of the present invention, a position-measuring device includes: a code including a series of code elements arranged one after another in a measuring direction, at least two successive code elements form a code word including a position information item; and a scanning device, including a detector unit having detector elements arranged to read the code elements of the code forming the code word, and an evaluation device adapted to ascertain the code word including current position information from scanning signals of the detector elements, the scanning device and the code movable relative to each other in the measuring direction. The code includes separation elements arranged between adjacent code elements that have identical properties in at least adjacent transition regions of the adjacent code elements, and each separation element is complementary to the adjacent transition regions of the adjacent code elements between which the separation element is arranged.

The evaluation device may include trigger components adapted to form a difference of analog scanning signals of even-numbered detector elements succeeding each other directly in the measuring direction and odd-numbered detector elements succeeding each other directly in the measuring direction.

The trigger components may include an error check device adapted to compare absolute values of the difference of the scanning signals and a comparison value and to output an error signal if the comparison value is undershot by the absolute value of the difference of the scanning signals.

The evaluation device may include a valuation unit, the trigger components may be arranged to output, to the valuation unit, at least one of (a) a logical value and (b) the error signal in accordance with the difference of the scanning signals, and the valuation unit may be adapted to ascertain the code word in accordance with input signals from the trigger components.

The valuation unit may be adapted to form groups from the input signals from the trigger components and to ascertain the code word from a group having a least number of error signals.

Two partial regions of a code element may have mutually complementary optical properties.

The detector elements may be arranged in the measuring direction at intervals corresponding to half of a length of a partial region of the code element.

A first one of the two partial regions may be substantially opaque, and a second one of the two partial regions may be substantially transparent.

A first one of the two partial regions may be reflective, and a second one of the two partial regions may be substantially non-reflective.

A width of the separating elements may be between one of (a) 5% and 8.5% and (b) 7% and 8% a width of the code elements.

The position-measuring device may be arranged to measure at least one of (a) linear motion and (b) rotary motion.

The code may be affixable to a first object, the scanning device may be affixable to a second object, the first object and the second object may be movable relative to each other, and the position-measuring device may be configured to measure relative motion between the first object and the second object.

A first one of (a) the first object and (b) the second object may include a table of a machine tool, and a second one of (a) the first object and (b) the second object may include a carriage of the machine tool.

A first one of (a) the first object and (b) the second object may include a table of a coordinate measurement machine, and a second one of (a) the first object and (b) the second object may include a carriage of the coordinate measurement machine.

A first one of (a) the first object and (b) the second object may include a rotor of an electric motor, and a second one of (a) the first object and (b) the second object may include a stator of the electric motor.

The code may be affixed to a first object, the scanning device may be affixed to a second object, the first object and the second object may be movable relative to each other, and the position-measuring device may be configured to measure relative motion between the first object and the second object.

The separation elements may be arranged only between the adjacent code elements that have identical properties in the adjacent transition regions, e.g., separation elements are not arranged between adjacent code elements that have non-identical, e.g., complementary, properties in the adjacent transition regions.

Example embodiments of the present invention are described in further detail below with reference to the appended Figures.

DETAILED DESCRIPTION

Figure 1:
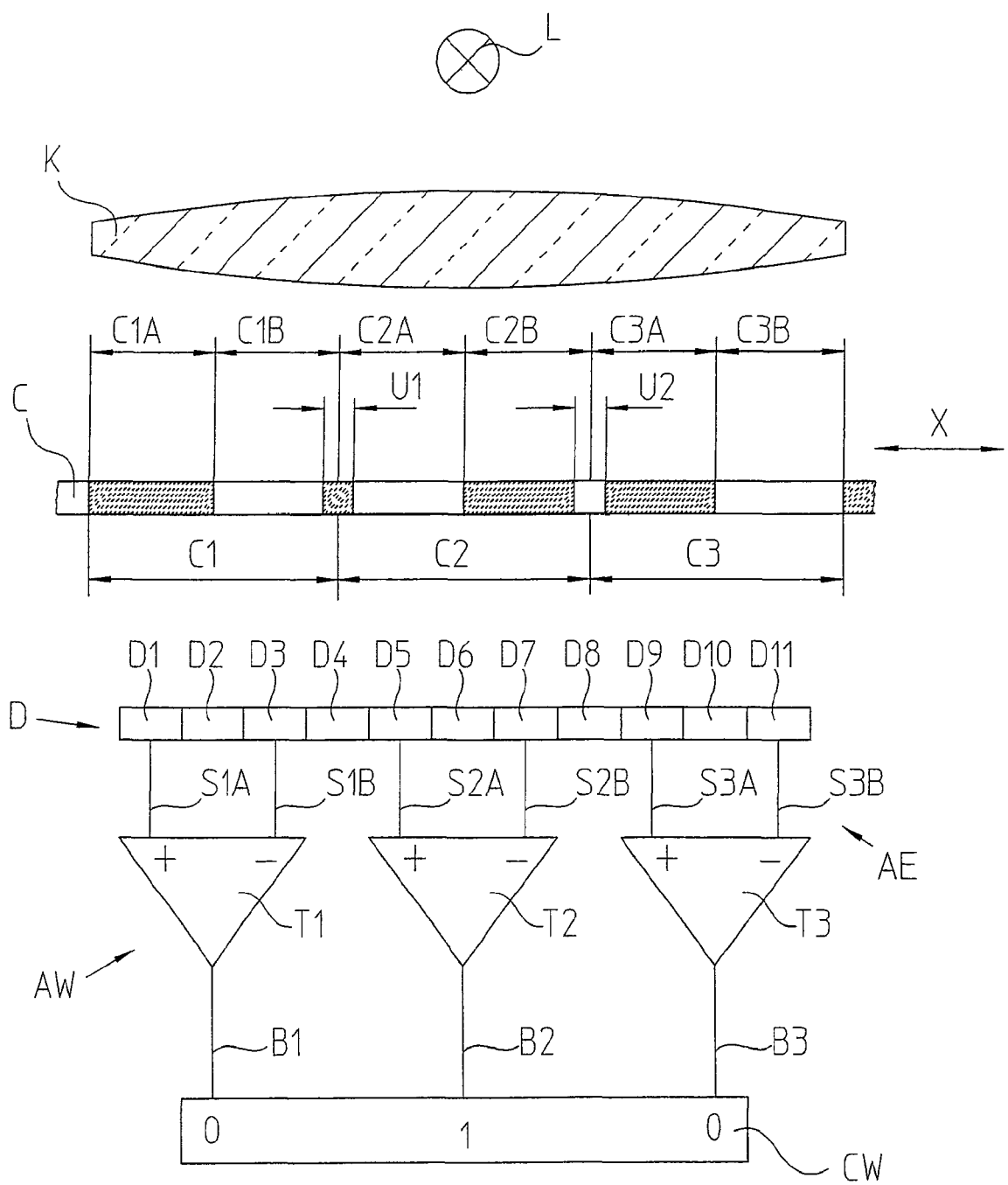
FIG. 1 is a schematic view of a position-measuring device.

FIG. 1 schematically illustrates a position-measuring device arranged according to an example embodiment of the present invention, this position-measuring device corresponding largely to a position-measuring device described in German Published Patent Application No. 102 44 235, which is expressly incorporated herein in its entirety by reference thereto. This position-measuring device operates in accordance with the optical scanning principle in which a code C is scanned using the transmitted-light method. A scanning device AE, which is arranged in a movable manner relative to code C in measuring direction X, is used for scanning code C.

Code C includes a series of code elements C1, C2, C3 of equal length arranged one behind the other in measuring direction X. Each code element C1, C2, C3 includes two partial regions A and B of equal length, arranged adjacent to each other in direct succession in measuring direction X, which partial regions are configured to be complementary with respect to each other. In this context, complementary means that they possess inverse properties, that is, transparent and non-transparent in the case of the optical scanning principle, for example, or reflecting and non-reflecting in the case of incident-light scanning.

Sequential code C is scanned by scanning device AE, which contains a light source L, the light of which illuminates multiple successive code elements C1, C2, C3 via a collimator lens K. Code C modulates the light as a function of position such that a position-dependent light distribution results behind code C which is detected by a detector unit D of scanning device AE.

Detector unit D is a line sensor having a series of detector elements D1 to D11 arranged in measuring direction X. For reasons of clarity, only so many detector elements D1 to D11 are illustrated as are necessary to scan code C in the position shown. In each relative position, at least one detector element D1 to D11 is assigned to each partial region A, B of code elements C1, C2, C3 such that in each relative position of detector unit D with respect to code C a scanning signal S1A to S3B is obtained from each partial region A, B. These scanning signals S1A to S3B are supplied to an evaluation device AW, which processes the two scanning signals S1A, S1B; S2A, S2B; S3A, S3B of the two partial regions C1A, C1B; C2A, C2B; C3A, C3B of a code element C1, C2, C3 in pairs, and which generates for each code element C1, C2, C3 a digital value or a bit B1, B2, B3. A series of multiple digital values B1, B2, B3 yields a code word CW, which defines the absolute position. When shifting detector unit D with respect to code C by the width or length of a code element C1, C2, C3, a new code word CW is generated and a plurality of different code words CW is formed over the measuring region that is to be measured in an absolute manner.

FIG. 1 illustrates a current position of code C relative to scanning device AE. Detector elements D1 to D11 are arranged in succession at interval of half of the width of a partial region C1A to C3B of code C. This provides that at any position at least one detector element D1 to D11 is clearly assigned to a partial region C1A to C3B and does not scan a transition between two partial regions C1A to C3B. In the illustrated position, partial region C1A is scanned by detector element D1 and partial region C1B is scanned by detector element D3. Detector elements D1, D3 detect the distribution of light and generate, as a function of the light intensity, an analog scanning signal S1A, S1B in proportion to the light intensity. Since the two partial regions C1A and C1B are arranged to be complementary with respect to each other, the intensity of scanning signals S1A and S1B is also inverse with respect to each other, that is, the signal levels are a great distance apart from each other.

This signal separation is utilized for generating binary information B1 in that a check is performed to determine which of the two scanning signals S1A, S1B of code element C1 is greater. This check may be performed by quotient formation or by difference formation. Difference formation is used in the example, for which purpose evaluation device AW, as illustrated in FIG. 1, includes comparators in the form of trigger components T1, T2, T3. Thus, trigger component T1 generates, for example, B1="0" if S1A is smaller than S1B and B1="1" if S1A is greater than S1B. In the same manner, binary information B2 and B3 is obtained by scanning code elements C2, C3 and comparison of analog scanning signals S2A, S2B; S3A, S3B of partial regions C2A, C2B; C3A, C3B of respectively one code element C2, C3 on the part of trigger components T2, T3.

A first sequence of partial regions A, B arranged in a complementary manner with respect to each other is thus assigned a first digital value and a second sequence of partial regions A, B developed in a complementary manner with respect to each other is assigned a second digital value. In the example, the sequence opaque→transparent is assigned the value 0, and the sequence transparent opaque is assigned the value 1.

Since the two partial regions A and B of each code element C1, C2, C3 are complementary with respect to each other, the signal-to-interference ratio of scanning signals S is very large. A change in the light intensity of light source L influences scanning signals S of both partial regions A and B equally.

Due to the complementary arrangement of respectively two partial regions A, B of a code element C1, C2, C3, provided the position-measuring device operates correctly, scanning these partial regions A, B must respectively generate analog scanning signals S, the magnitude of the difference of which exceeds a specified value. Monitoring this differential value allows for sufficient error checking. The basis of this error check is that it may be assumed that when the differential value is undershot by a specified amount, the binary information B1, B2, B3 is unreliable and that therefore an error signal F is generated for this binary information B1, B2, B3.

Figure 2:
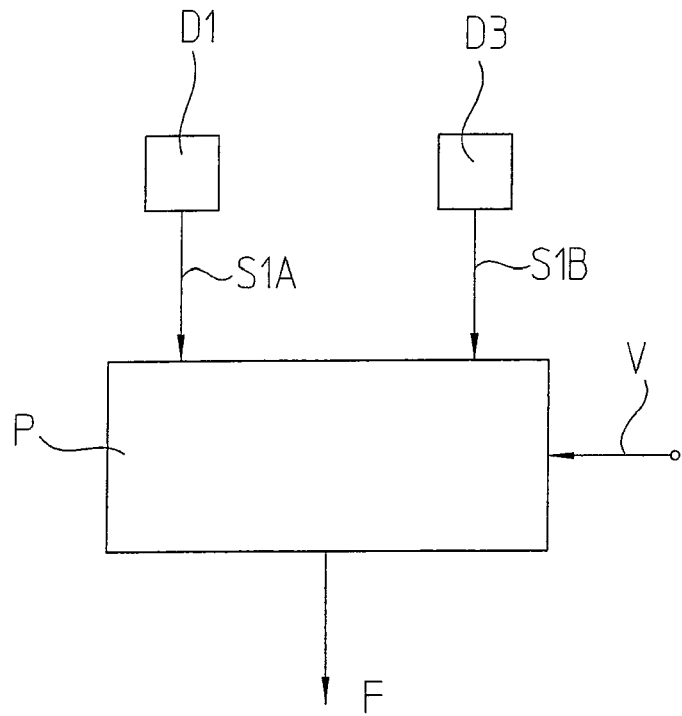
FIG. 2 illustrates the principle of an error check.

The principle of generating error signal F is illustrated in FIG. 2. Analog scanning signals S1A and S1B of code element C1 are supplied to an error check device P. Error check device P compares S1A and S1B by difference formation (S1A−S1B) and checks whether the magnitude of the difference exceeds or does not exceed a specified comparison value V.

Figure 3:
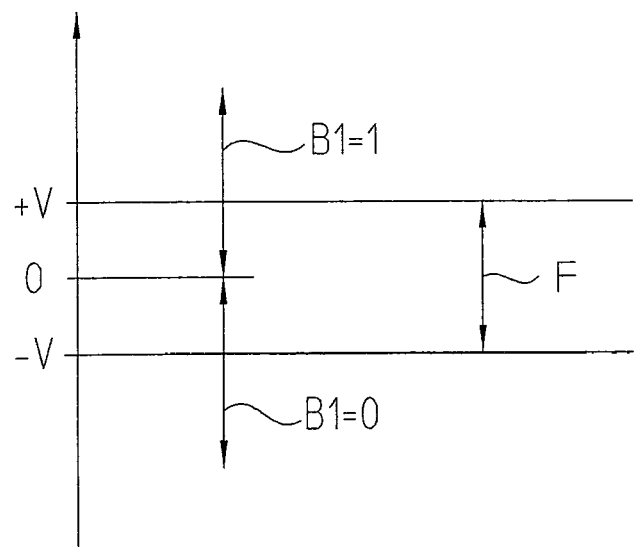
FIG. 3 illustrates the signals for the error check as illustrated in FIG. 2.

Comparison value V may be chosen such that an error signal F is already generated if one of the analog scanning signals S1A, S1B used for the comparison falls in terms of its absolute value. This is the case, for example, in the transition from one partial region of a code element C1, C2, C3 to the next or in the transition from one code element C1, C2, C3 to the next if the two successive code elements have different properties in the transition region. If the magnitude of the difference (S1A−S1B) does not exceed the specified comparison value V, then an error signal F is emitted. These signal relationships are illustrated in FIG. 3. Concretely, error check device P may be, e.g., a conventional window comparator.

Error check devices P may be integrated into the trigger components. In this instance, error signal F may be output, for example, over a separate line and evaluated.

Alternatively, the trigger components may be arranged such that the outputs may assume three states, for example, a positive voltage for a logical "1," a negative voltage for a logical "0," and 0 volts for signaling an error signal F.

According to example embodiments of the present invention, in places where in measuring direction X code elements C1, C2, C3 adjoin that have the same properties in the transition region, separating elements U1, U2 having respectively complementary properties are inserted. If code C is a serial code, as illustrated in FIG. 1, for example, in which the individual code elements C1, C2, C3 have a Manchester encoding, then this is always the case when a code change occurs, in other words, when a code element C1, C2, C3, which corresponds to a logical "1," follows upon a code element C1, C2, C3, which corresponds to a logical "0," and vice versa. If a simple serial code C is used, in which code elements C1, C2, C3 are made up merely of one field having a certain property, then this would be the case when two identical code elements C1, C2, C3 follow upon each other.

On the assumption that in FIG. 1 partial regions C1B and C2A are transparent in the transition region between code elements C1 and C2, separating element U1 has opaque properties. Likewise, separating element U2 between opaque partial regions C2B and C3A has transparent properties in the transition region between code elements C2 and C3.

The detector elements are evaluated in pairs by forming differential signals, as emerges from the description of FIG. 1. For this purpose, it is important to be able to distinguish which detector elements form and which do not form a valid position value in the respective relative position of scanning unit AE differentially switched with respect to code C.

FIGS. 4a to 4d illustrate four positions of scanning unit AE with respect to code C. In this example, detector unit D includes fourteen detector elements D1 to D14, whose scanning signals S are supplied to an evaluation device AW.

For processing scanning signals S, the evaluation unit includes twelve comparators in the form of trigger components T1 to T12 as well as a valuation unit BW to which the results of the evaluation in trigger components T1 to T12 are output and which, following the valuation of the input signals, outputs code word CW, made up of bits B1, B2, B3, as the result of the scan.

In which form the result is output is not critical. Thus, the output may occur, as illustrated, in parallel as well as serially. Likewise, scanning unit AE may include additional components for outputting the result, for example, to a machine tool control. For the sake of completeness, it should also be mentioned that the components of scanning unit AE may also be arranged in a spatially separated manner.

The number of detector elements D1 to D14 is chosen such that at each relative position of scanning unit AE with respect to code C a reliable code word CW may be ascertained.

For this purpose, trigger components T1 to T12 are used to form the difference of respective pairs of consecutive even-numbered detector elements D2, D4, D6, D8, D10, D12, D14 as well as of respective pairs of odd-numbered detector elements D1, D3, D5, D7, D9, D11, D13 and to compare the result with a comparison value V in terms of absolute value. Trigger components T1 to T12 thus also include error check devices P. If the magnitude of the differential signal falls below comparison value V, it is categorized as invalid, and the relevant trigger component T1 to T12 outputs an error signal F. On the other hand, if the magnitude of the differential signal reaches or exceeds comparison value V, then trigger component T1 to T12 outputs a logical value, a logical "1" or a logical "0," depending on the polarity of the differential signal.

Figure 4A:
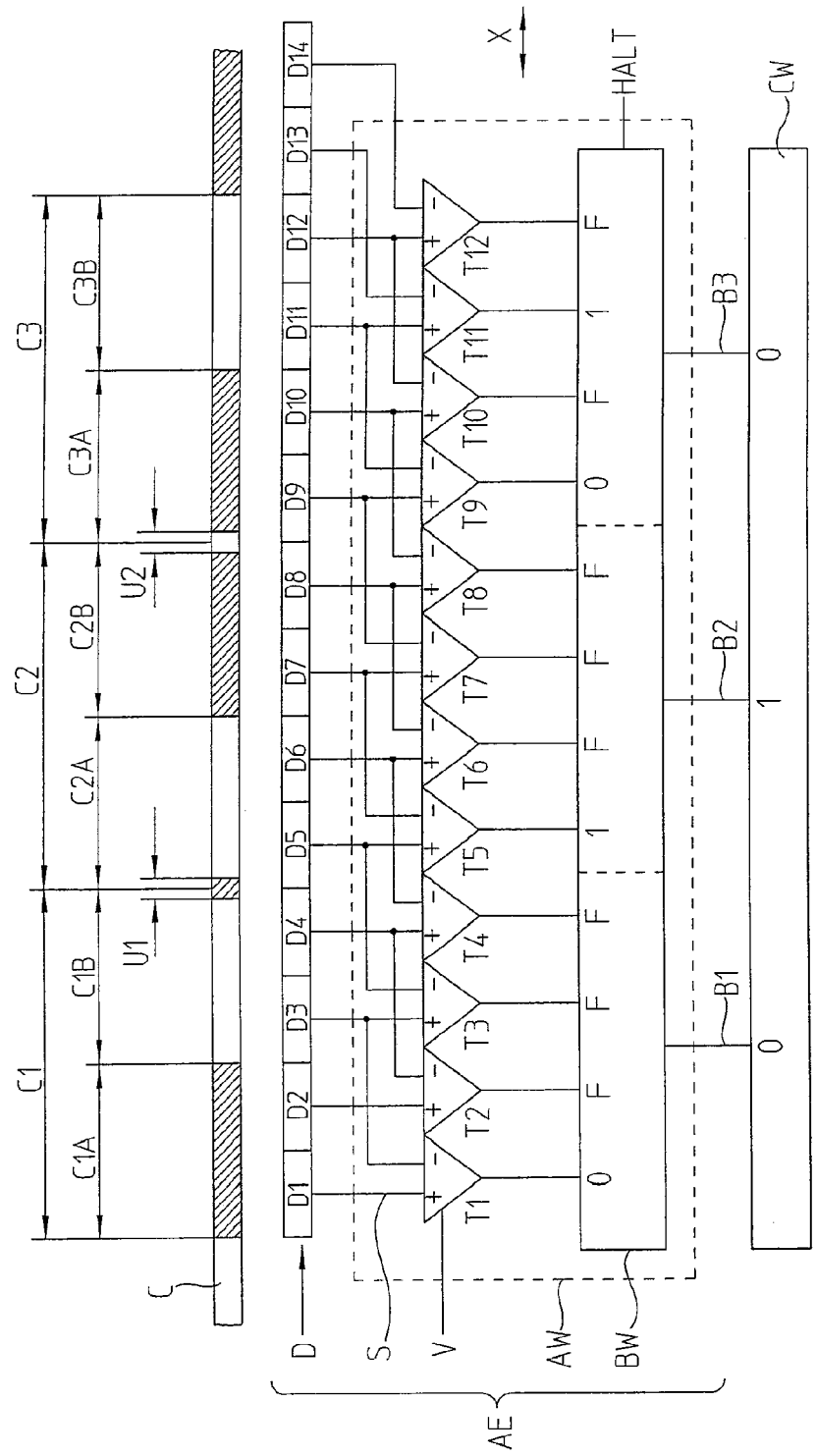
FIG. 4a schematically illustrates a first scanning position of a position-measuring device according to an example embodiment of the present invention.

As illustrated in FIG. 4a, the digital value of code element C1 may be ascertained, for example, from the differential connection of the scanning signals of detector elements D1 and D3 using comparator T1, the digital value of code element C2 from the scanning signals of detector elements D5 and D7 using comparator T5, and the digital value of code element C3 from the scanning signals of detector elements D9 and D11 using comparator T9.

Even-numbered detector elements D2, D4, D6, D8, D10, D12, D14 provide invalid scanning signals since they are located either in transition regions between two code elements C1, C2, C3 or between two partial regions C1A, C1B; C2A, C2B; C3A, C3B within a code element C1, C2, C3. Accordingly, even-numbered trigger components T2, T4, T6, T8, T10, T12, which evaluate even-numbered detector elements D2, D4, D6, D8, D10, D12, D14, output error signals F because the generated differential signals respectively fall below comparison value V in terms of absolute value. In the remaining trigger components T3, T7 and T11, using which the remaining combinations of odd-numbered detector elements D1, D3, D5, D7, D9, D11, D13 are evaluated, the result of the evaluation depends on the sequence of code elements C1, C2, C3 of code C. In the event of a bit change, that is, a logical "0" that follows upon a logical "1," or vice versa, the result of the evaluation is also an error signal F. As illustrated in FIG. 4a, this is the case in trigger components T3 and T7. If two identical code elements C1, C2, C3 succeed each other, by contrast, as is indicated in the code element following upon code element C3, then the evaluation by comparator T11 yields a valid digital value, in the case shown, a logical "1."

In the present example, detector elements D1 to D14 are arranged in measuring direction X at intervals corresponding to half the length of a partial region A, B of code elements C1, C2, C3. By differential scanning, this results in four detector pairs for the scanning of one code element C1, C2, C3, depending on the relative position of code C with respect to scanning unit AE, with reference to FIGS. 4a to 4d, for example, for scanning code element C1, detector elements D1-D3 (FIG. 4a), D2-D4 (FIG. 4b), D3-D5 (FIG. 4c) and D4-D6 (FIG. 4d), in accordance with the output signals of trigger components T1 to T4. Furthermore, trigger components T1 to T12 may be divided into four groups, at least one group outputting the current code word CW at each relative position of scanning unit AE with respect to code C. As illustrated in FIGS. 4a to 4d, a first group is made up of trigger components T1, T5, T9, a second group is made up of trigger components T2, T6, T10, a third group is made up of trigger components T3, T7, T11, and a fourth group is made up of trigger components T4, T8, T12. Valuation unit BW in each case ascertains the group whose outputs have the least or no error signals F at all and outputs these as the result of the position measurement as the code word CW.

Whether, and, if so, how many, error signals F may occur in a group depends on code C. If the latter is not designed redundantly, then no error signal F is admissible, since each code element C1, C2, C3 must be clearly identifiable in order to determine the position correctly. In a redundantly designed code C, the number of admissible error signals F depends on how many faulty bits in a code word CW may be compensated for by the redundancy.

Figure 4B:
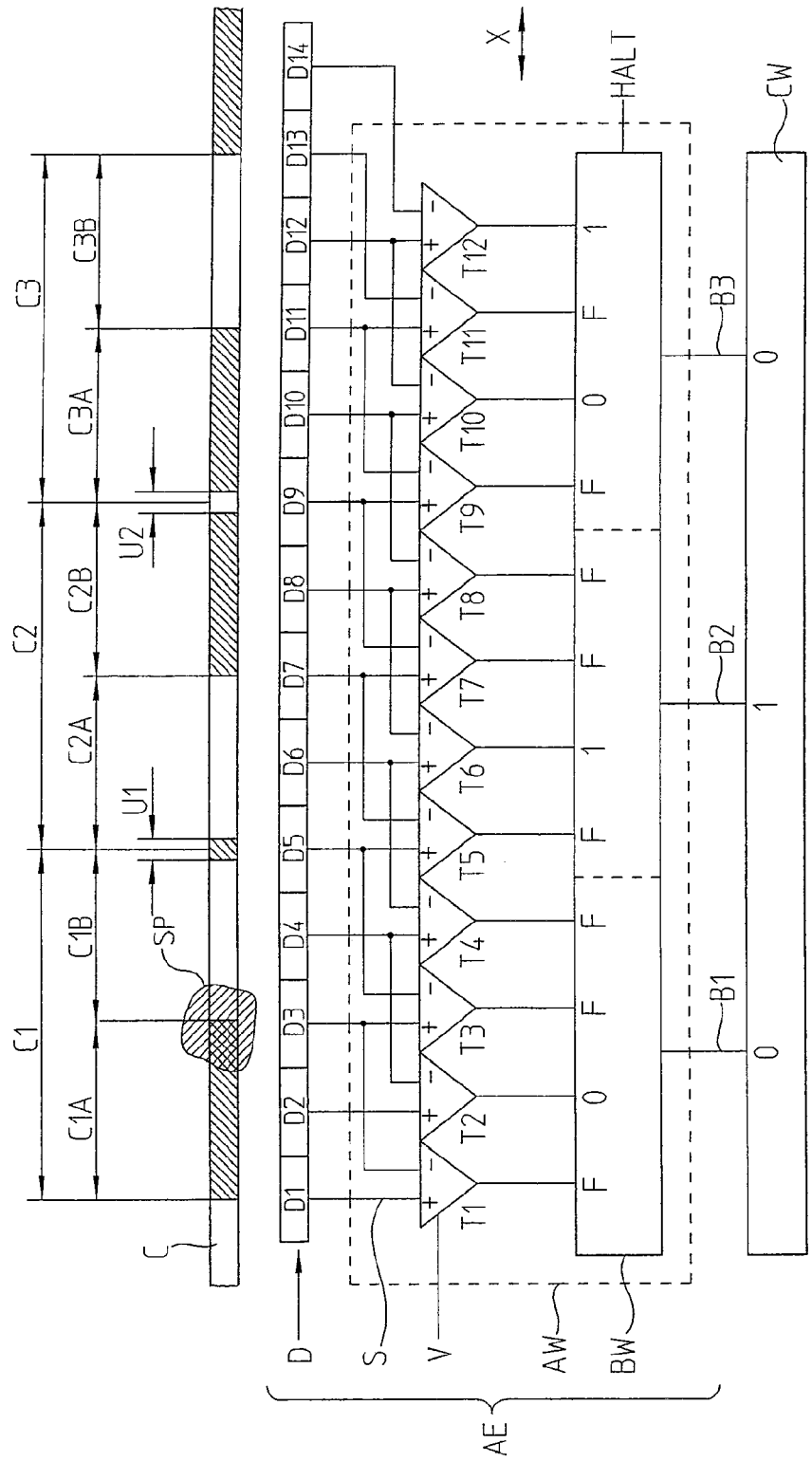
FIG. 4b schematically illustrates a second scanning position of a position-measuring device according to an example embodiment of the present invention.
Figure 4C:
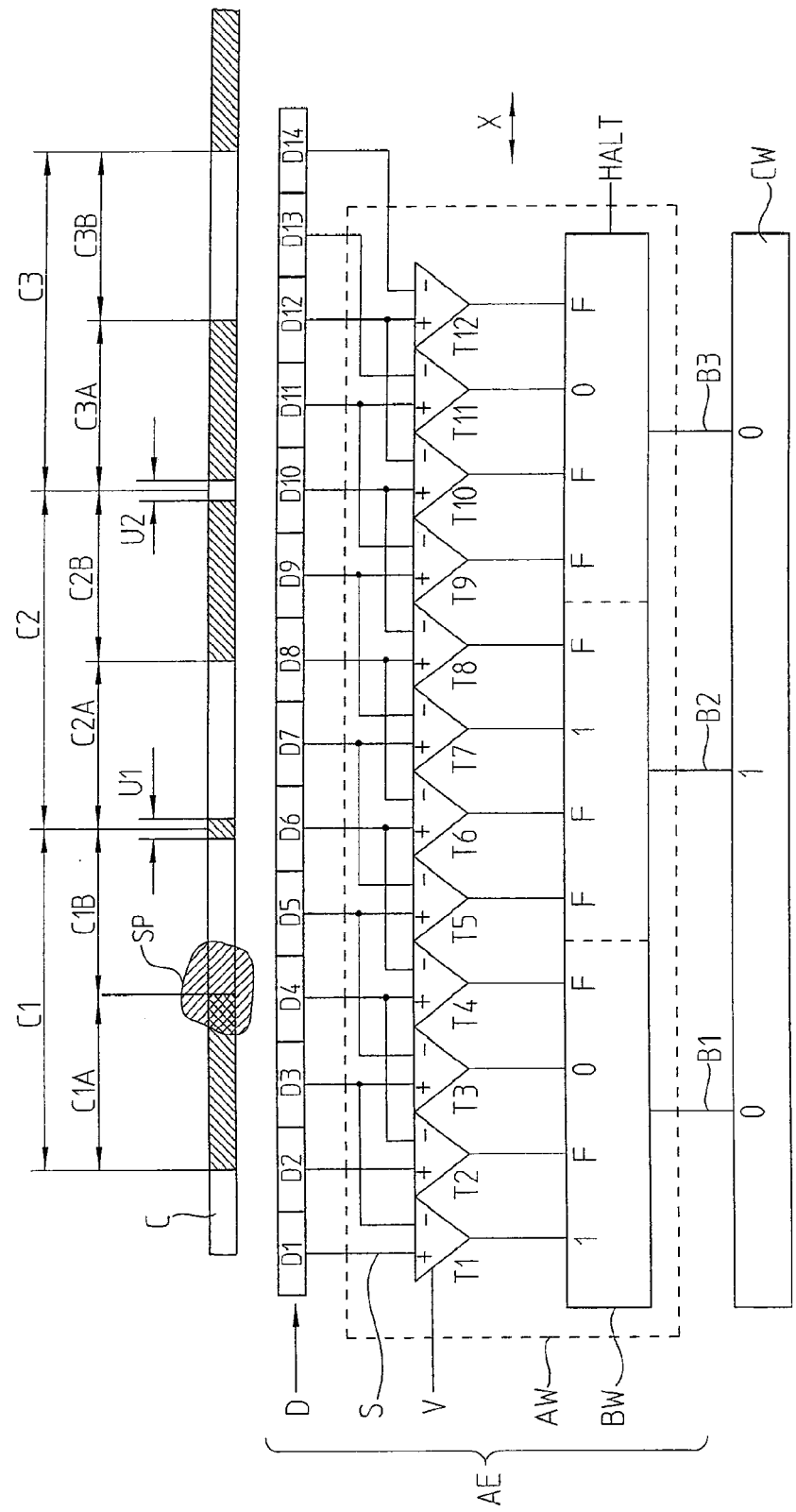
FIG. 4c schematically illustrates a third scanning position of a position-measuring device according to an example embodiment of the present invention.
Figure 4D:
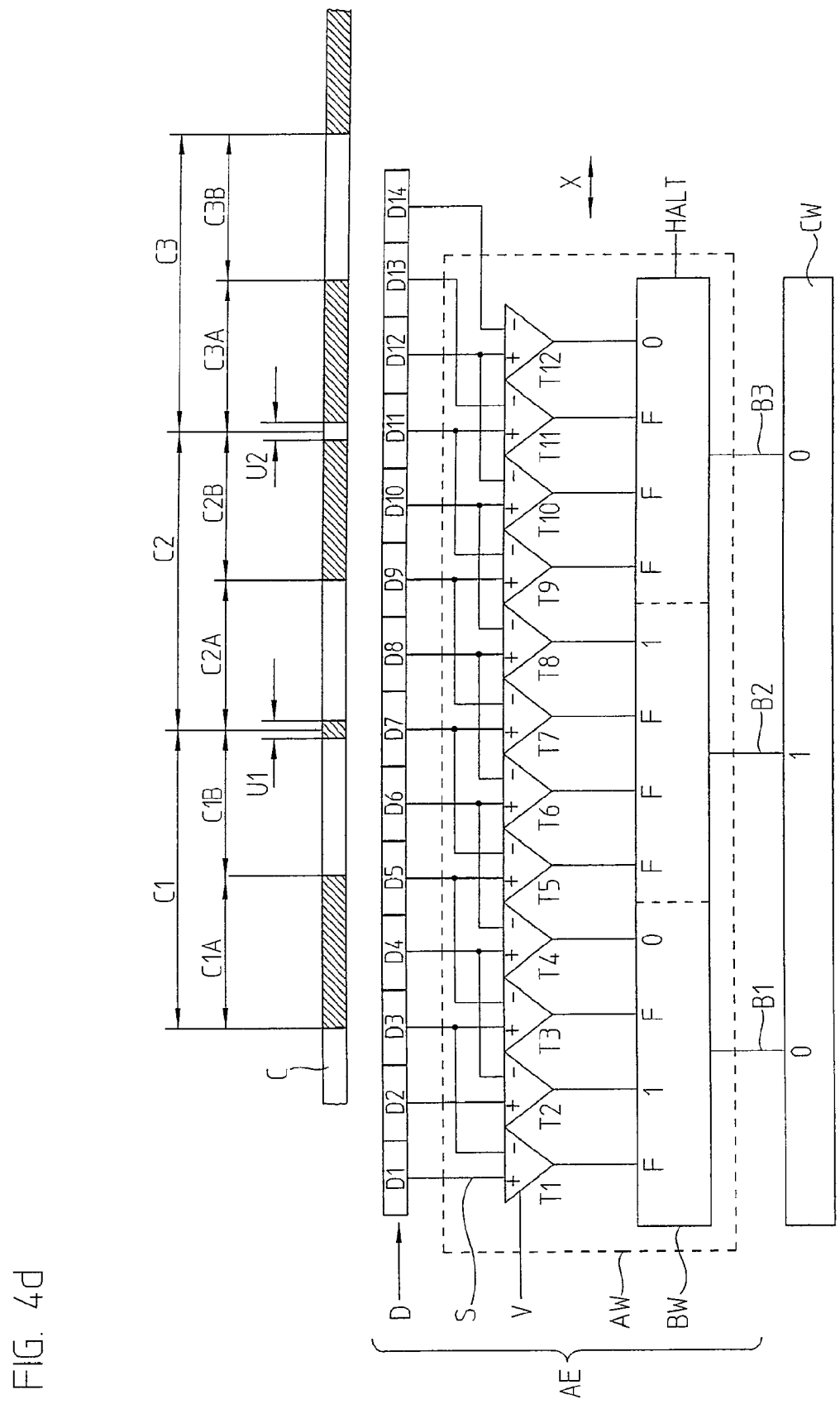
FIG. 4d schematically illustrates a fourth scanning position of a position-measuring device according to an example embodiment of the present invention.

In order to explain further the arrangement of separating elements U1, U2, a dirt particle SP is illustrated in FIGS. 4b and 4c in the transition region between partial regions C1A and C1B of code element C1. Such contaminations may arise in the course of the service life of a position measuring device, for example, by the deposition of wear debris, droplets of lubricant, material intruding from outside, etc. It should be assumed in the following that scanning unit AE moves relative to code C from left to right, which corresponds to a transition from FIG. 4c to FIG. 4b. Furthermore, it should be assumed that it is a position-measuring device, which operates according to the transmitted-light principle, as illustrated in FIG. 1 for example, partial region C1A of code element C1 being opaque and partial region C1B of code element C1 being transparent.

Since dirt particle SP also has opaque properties, the evaluation of the output signal of detector element D3 alone is insufficient to determine that detector element D3 is in a transition region, and detector element D2 would have to be used to evaluate partial region C1A of code element C1 for determining the position correctly. Thus, without separating element U1, comparator T3 would continue to ascertain a valid digital value, namely a logical "0," in the position illustrated in FIG. 4b. Separating element U1, however, results in a drop of scanning signal S on detector element D5 and thus in an output of an error signal F by trigger unit T3.

As described above, even in fault-free operation, trigger components T1 to T12 may ascertain valid digital values, which nevertheless must not be used to determine current code word CW, that is, when successive code elements C1, C2, C3 have the same encoding. This is the case, for example, illustrated in FIG. 4b in comparator T12. In combination with the digital values mistakenly obtained due to contaminations effects, the probability rises that at one time two code words CW are produced that differ from each other. Since in this case an error-free and especially a risk-free operation of the machine on which the position-measuring device is operated is no longer guaranteed, the latter must be stopped, for example, by a stopping signal HALT, which valuation unit BW outputs to a primary control. The insertion of separating elements U1, U2 lowers the likelihood of such a failure significantly and thus increases the service life and reliability of the position-measuring device.

Figure 5:
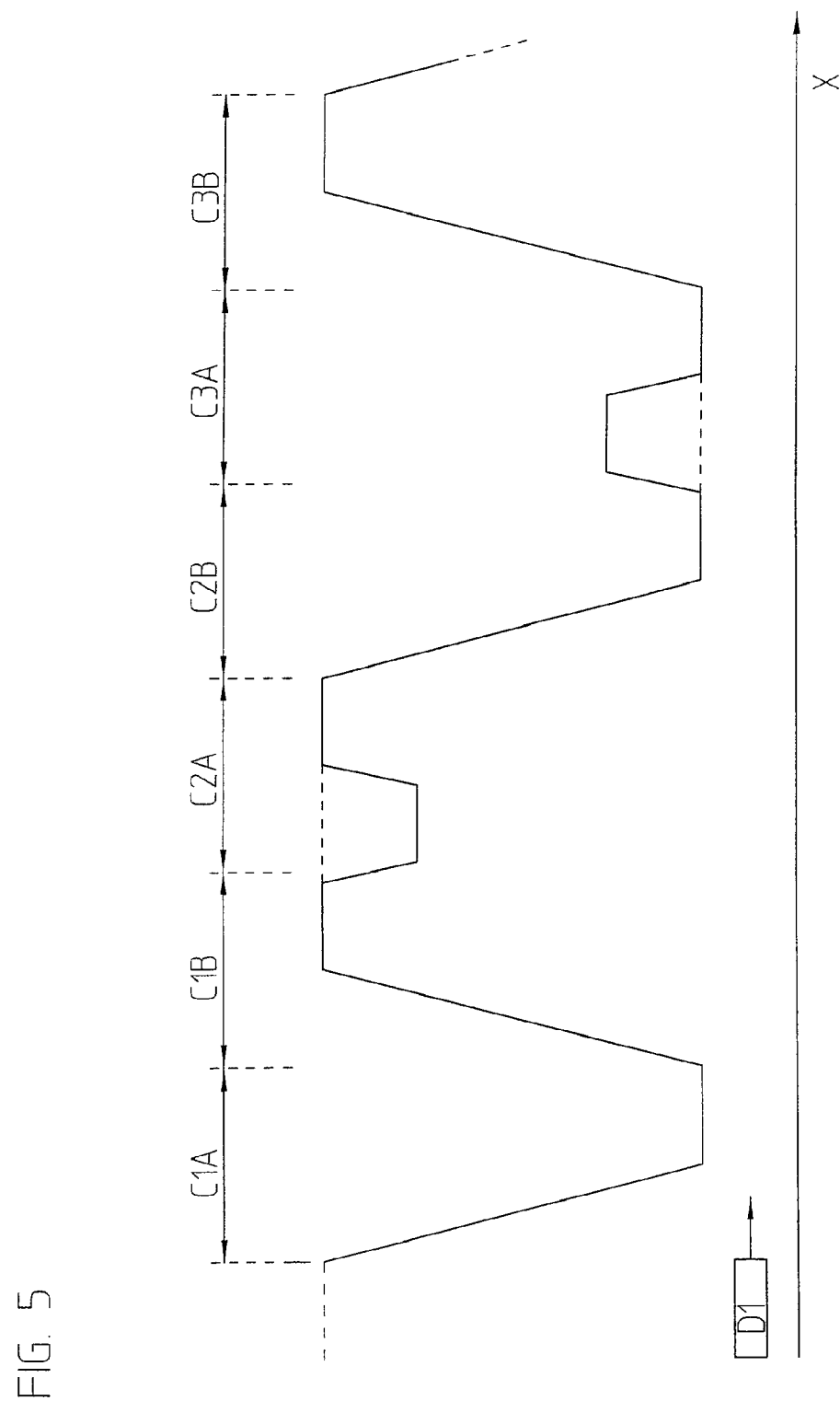
FIG. 5 illustrates a signal pattern on a detector element in a position-measuring device according to an example embodiment of the present invention.

The operating mode of separating elements U1, U2 is explained once more with reference to FIG. 5. The curve illustrates the characteristic of the signal intensity on a detector element D1 to D14 when scanning unit AE moves relative to code C in measuring direction X from partial region C1A of code element C1 to partial region C3B of code element C3. In the case of a conventional code C, that is, without separating elements U1, U2, the intensity curve in the transition regions between partial regions C1B-C2A and C2B-C3A, respectively, would follow the dashed lines, and it would not be possible to detect the transition. The insertion of separating elements U1, U2 results in a significant signal drop in the transition region between partial regions C1B-C2A or to a signal rise between partial regions C2B-C3A. This makes it possible to detect the transition even if detector elements D1 to D14 are evaluated individually. By separating elements U1, U2, as already described, the differential connection of detector elements D1 to D14 achieves a substantially higher reliability in the detection of transitions between code elements C1, C2, C3.

The strength of the signal drop or signal rise caused by separating elements U1, U2 largely depends on the size of separating elements U1, U2 in relation to the size of detector elements D1 to D14, in particular on the degree of coverage of detector elements D1 to D14 by separating elements U1, U2. In practice, the influence of separating elements U1, U2 on the detector signals should set itself apart from signal fluctuations caused by interference effects such as contamination or signal noise, for example. The reliable detection of the transition between two code elements that have the same properties in the transition region may be improved by dimensioning separating elements U1, U2 such that in a maximum coverage of a detector element D1 to D14 by a separating element U1, U2, a signal drop or a signal rise of greater than or equal to 20% in relation to the maximum or minimum amplitude of the detector signal is effected.

In order to ensure that the influence of separating elements U1, U2 on detector elements D1 to D14 is distinguishable from the influence of code elements C1, C2, C3, or the partial regions of code elements C1A to C3B, it may be provided to choose the width of separating elements U1, U2 to be substantially smaller than the width of code elements C1, C2, C3. For example, the width of separating elements U1, U2 may be between 5% and 8.5%, e.g., between 7% and 8% of the width of code elements C1, C2, C3.

The two partial regions A, B of each code element C1, C2, C3 may be optically scannable, in which case a partial region A is transparent or reflecting for the scanning light, while the other partial region B is opaque or non-reflecting. It should be understood, however, that the present invention is not limited to the optical scanning principle, but may, e.g., also be applied to magnetic scanning principles.

The absolute position-measuring device may be used for measuring linear or rotary motions, code C being affixed to one of the moving objects and scanning device AE being affixed to the other of the objects to be measured. For this purpose, code C may be affixed directly on the object to be measured or on a scale, which in turn is coupled to the object to be measured.

The objects to be measured may be the table and the sliding carriage of a machine tool or a coordinate measuring machine or also the rotor and the stator of an electric motor.

What is claimed is:

1. A position-measuring device, comprising:
   a code including a series of code elements arranged one after another in a measuring direction, at least two successive code elements form a code word including a position information item; and
   a scanning device, including a detector unit having detector elements arranged to read the code elements of the code forming the code word, and an evaluation device adapted to ascertain the code word including current position information from scanning signals of the detector elements, the scanning device and the code movable relative to each other in the measuring direction;
   wherein a first subset of adjacent code elements of the code have identical properties in the transition region between the adjacent code elements and a second subset of adjacent code elements of the code have different properties in the transition region between the adjacent code elements;
   wherein the code includes separation elements arranged between adjacent code elements that have identical properties in at least adjacent transition regions of the adjacent code elements;
   wherein each separation element has uniform properties throughout, the properties of each separation element being inverse to the identical properties of the adjacent transition regions of the adjacent code elements between which the separation element is arranged; and
   wherein a scanning signal of a detector element that reads the code at a separation element has a temporary change in intensity in relation to a scanning signal of immediately adjacent detector elements to reliably detect transitions between adjacent code elements that have identical properties in the transition region between the adjacent code elements.

2. The position-measuring device according to claim 1, wherein the evaluation device includes trigger components adapted to form a difference of analog scanning signals of even-numbered detector elements succeeding each other directly in the measuring direction and odd-numbered detector elements succeeding each other directly in the measuring direction.

3. The position-measuring device according to claim 2, wherein the trigger components include an error check device adapted to compare absolute values of the difference of the scanning signals and a comparison value and to output an error signal if the comparison value is undershot by the absolute value of the difference of the scanning signals.

4. The position-measuring device according to claim 3, wherein the evaluation device includes a valuation unit, the trigger components arranged to output, to the valuation unit, at least one of (a) a logical value and (b) the error signal in accordance with the difference of the scanning signals, the valuation unit adapted to ascertain the code word in accordance with input signals from the trigger components.

5. The position-measuring device according to claim 4, wherein the valuation unit is adapted to form groups from the input signals from the trigger components and to ascertain the code word from a group having a least number of error signals.

6. The position-measuring device according to claim 1, wherein two partial regions of a code element have mutually complementary optical properties.

7. The position-measuring device according to claim 6, wherein a first one of the two partial regions is substantially opaque and a second one of the two partial regions is substantially transparent.

8. The position-measuring device according to claim 6, wherein a first one of the two partial regions is reflective and a second one of the two partial regions is substantially non-reflective.

9. The position-measuring device according to claim 1, wherein the detector elements are arranged in the measuring direction at intervals corresponding to half of a length of a partial region of the code element.

10. The position-measuring device according to claim 1, wherein a width of the separating elements is between one of (a) 5% and 8.5% and (b) 7% and 8% a width of the code elements.

11. The position-measuring device according to claim 1, wherein the position-measuring device is arranged to measure at least one of (a) linear motion and (b) rotary motion.

12. The position-measuring device according to claim 1, wherein the code is affixable to a first object and the scanning device is affixable to a second object, the first object and the second object movable relative to each other, the position-measuring device configured to measure relative motion between the first object and the second object.

13. The position-measuring device according to claim 12, wherein a first one of (a) the first object and (b) the second object includes a table of a machine tool and a second one of (a) the first object and (b) the second object includes a carriage of the machine tool.

14. The position-measuring device according to claim 12, wherein a first one of (a) the first object and (b) the second object includes a table of a coordinate measurement machine and a second one of (a) the first object and (b) the second object includes a carriage of the coordinate measurement machine.

15. The position-measuring device according to claim 12, wherein a first one of (a) the first object and (b) the second object includes a rotor of an electric motor and a second one of (a) the first object and (b) the second object includes a stator of the electric motor.

16. The position-measuring device according to claim 1, wherein the code is affixed to a first object and the scanning device is affixed to a second object, the first object and the second object movable relative to each other, the position-measuring device configured to measure relative motion between the first object and the second object.

17. The position-measuring device according to claim 1, wherein the temporary change in intensity is a reduction of intensity for a separation element that is between two lighter code elements.

18. The position-measuring device according to claim 1, wherein the temporary change in intensity is an increase of intensity for a separation element that is between two darker code elements.

19. The position-measuring device according to claim 1, wherein the temporary change in intensity is a function of a size of the separation element in relation to a size of the detector element that reads the code at the separation element.

20. The position-measuring device according to claim 19, wherein the temporary change in intensity is a function of amount of coverage of the detector element that reads the code at the separation element by the separation element.

21. The position-measuring device according to claim 1, wherein the temporary change in intensity is 20% or greater of a maximum and/or minimum amplitude of the scanning signals of the detector elements.

22. A position-measuring device, comprising:
- a code including a series of code elements arranged one after another in a measuring direction, at least two successive code elements form a code word including a position information item; and
- a scanning device, including a detector unit having detector elements arranged to read the code elements of the code forming the code word, and an evaluation device adapted to ascertain the code word including current position information from scanning signals of the detector elements, the scanning device and the code movable relative to each other in the measuring direction;
- wherein a first subset of adjacent code elements of the code have identical properties in the transition region between the adjacent code elements and a second subset of adjacent code elements of the code have different properties in the transition region between the adjacent code elements;
- wherein the code includes separation elements arranged between adjacent code elements that have identical properties in at least adjacent transition regions of the adjacent code elements;
- wherein each separation element has properties inverse to the identical properties of the adjacent transition regions of the adjacent code elements between which the separation element is arranged;
- wherein the separation elements are arranged only between the adjacent code elements that have identical properties in the adjacent transition regions, and wherein separation elements are not arranged between adjacent code elements that have non-identical properties in the adjacent transition regions; and
- wherein a scanning signal of a detector element that reads the code at a separation element has a temporary change in intensity in relation to a scanning signal of immediately adjacent detector elements to reliably detect transitions between adjacent code elements that have identical properties in the transition region between the adjacent code elements.

23. A position-measuring device, comprising:
- a code including a series of code elements arranged one after another in a measuring direction, at least two successive code elements form a code word including a position information item; and
- a scanning device, including a detector unit having detector elements arranged to read the code elements of the code forming the code word, and an evaluation device adapted to ascertain the code word including current position information from scanning signals of the detector elements, the scanning device and the code movable relative to each other in the measuring direction;
- wherein a first subset of adjacent code elements of the code have identical properties in the transition region between the adjacent code elements and a second subset of adjacent code elements of the code have different properties in the transition region between the adjacent code elements;
- wherein the code includes separation elements arranged between adjacent code elements that have identical properties in at least adjacent transition regions of the adjacent code elements;
- wherein each separation element has properties inverse to the identical properties of the adjacent transition regions of the adjacent code elements between which the separation element is arranged;
- wherein a width of the separation elements is substantially less than a width of the code elements; and
- wherein a scanning signal of a detector element that reads the code at a separation element has a temporary change in intensity in relation to a scanning signal of immediately adjacent detector elements to reliably detect transitions between adjacent code elements that have identical properties in the transition region between the adjacent code elements.

* * * * *